United States Patent
Kobres et al.

(10) Patent No.: US 9,922,370 B2
(45) Date of Patent: Mar. 20, 2018

(54) TECHNIQUES FOR AUTOMATED TELLER MACHINE (ATM) TRANSACTIONS

(75) Inventors: Erick Kobres, Lawrenceville, GA (US); Bertrand Jean Jacques Mouden, Bures sur Yvette (FR)

(73) Assignee: NCR Corporation, Atlanta, GA (US)

( * ) Notice: Subject to any disclaimer, the term of this patent is extended or adjusted under 35 U.S.C. 154(b) by 224 days.

(21) Appl. No.: 13/296,359

(22) Filed: Nov. 15, 2011

(65) Prior Publication Data

US 2013/0124411 A1    May 16, 2013

(51) Int. Cl.
| | | |
|---|---|---|
| G06Q 40/02 | (2012.01) | |
| G06Q 20/10 | (2012.01) | |
| G07F 19/00 | (2006.01) | |
| G06Q 20/18 | (2012.01) | |

(52) U.S. Cl.
CPC ......... *G06Q 40/02* (2013.01); *G06Q 20/1085* (2013.01); *G06Q 20/18* (2013.01); *G07F 19/20* (2013.01)

(58) Field of Classification Search
CPC ...... G06Q 20/40; G06Q 20/10; G06Q 20/023; G06Q 20/322; G06Q 30/0215; G06Q 10/08355; G06Q 20/108; G06Q 20/1085; G06Q 20/16; G06Q 20/202; G06Q 20/3278; G06Q 20/385; G06Q 20/401; G06Q 30/0281; G06Q 30/0619; G06Q 40/02; G06Q 20/3223; G06Q 50/265
See application file for complete search history.

(56) References Cited

U.S. PATENT DOCUMENTS

| | | | | |
|---|---|---|---|---|
| 5,650,604 | A * | 7/1997 | Marcous et al. | 235/379 |
| 5,963,647 | A * | 10/1999 | Downing et al. | 705/39 |
| 7,680,738 | B2 * | 3/2010 | Amann et al. | 705/43 |
| 8,065,226 | B2 * | 11/2011 | Rizzo et al. | 705/39 |
| 8,353,448 | B1 * | 1/2013 | Miller et al. | 235/379 |
| 2006/0206709 | A1 * | 9/2006 | Labrou et al. | 713/167 |
| 2007/0295805 | A1 * | 12/2007 | Ramachandran | 235/379 |
| 2008/0222048 | A1 * | 9/2008 | Higgins et al. | 705/67 |
| 2009/0254479 | A1 * | 10/2009 | Pharris | 705/42 |
| 2011/0055084 | A1 * | 3/2011 | Singh | 705/43 |
| 2011/0238573 | A1 * | 9/2011 | Varadarajan | 705/43 |
| 2011/0251892 | A1 * | 10/2011 | Laracey | 705/14.51 |
| 2012/0160912 | A1 * | 6/2012 | Laracey | 235/379 |
| 2012/0187187 | A1 * | 7/2012 | Duff et al. | 235/382 |
| 2012/0197798 | A1 * | 8/2012 | Grigg | G06Q 20/1085 705/43 |
| 2012/0239570 | A1 * | 9/2012 | Wolfs et al. | 705/43 |

* cited by examiner

*Primary Examiner* — Elda G Milef
(74) *Attorney, Agent, or Firm* — Schwegman, Lundberg & Woessner (57) ABSTRACT

Techniques for automated transactions are provided. A customer pre-stages a financial transaction with a financial service. Subsequently, the customer visits an ATM and automatically acquires a code from the ATM that is then sent to a mobile transaction service for verification and to identify the staged financial transaction. The ATM interacts with the customer via the mobile device and interacts with the financial service to complete the transaction for the customer at the ATM.

11 Claims, 4 Drawing Sheets

TECHNIQUES FOR AUTOMATED TELLER MACHINE (ATM) TRANSACTIONS

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, WiFi communication, and the like.

So, increasingly customers are engaging in a variety of technologies to automatically interact with enterprises to perform transactions. The transactions may result in purchases or may result in such things as registration for loyalty programs, enrolling in promotional events, requesting additional information for a good or service, and others. That is, the transactions via these kiosks are not strictly tied to purchases although some transactions are purchase related.

On particular type of kiosk that everyone is familiar with is the traditional Automated Teller Machine (ATM). These are situated these days at locations where consumers often need some cash. They also appear outside of enterprises, such as banks and grocery stores, or even inside stores and venues. In fact, ATM's are ever present these days in society.

Of particular concern with the ATM is security. The main security deterrents used in the industry are related to physical lighting located around the ATM's and cameras that are embedded in the machines and that may even surround the machines. This type of security still has drawbacks because thieves are getting smarter and have devices that can detect the passcode entered for ATM cards used by consumers at an ATM, or even duplicate the card. In fact, in crowded venues someone can simply look over the shoulder of a customer and detect a pass code being entered. Banks and financial institutions are always looking for ways to thwart these electronic and human eavesdroppers.

SUMMARY

In various embodiments, techniques for automated teller machine (ATM) transactions are presented. According to an embodiment, a method for an automated transaction with an ATM is provided.

Specifically, a financial service interacts with a customer to define a transaction to perform at a subsequent Automated Teller Machine (ATM) during an out-of-band transaction between the customer and the ATM. The financial service stages the transaction along with a customer identifier for the customer and sends a financial transaction identifier to a mobile app of a mobile device of the customer for use when at the ATM in performing the staged transaction. Finally, the financial service sets policy restrictions for when an unprocessed staged transaction is to be removed and declared invalid.

DETAILED DESCRIPTION

Figure 1:
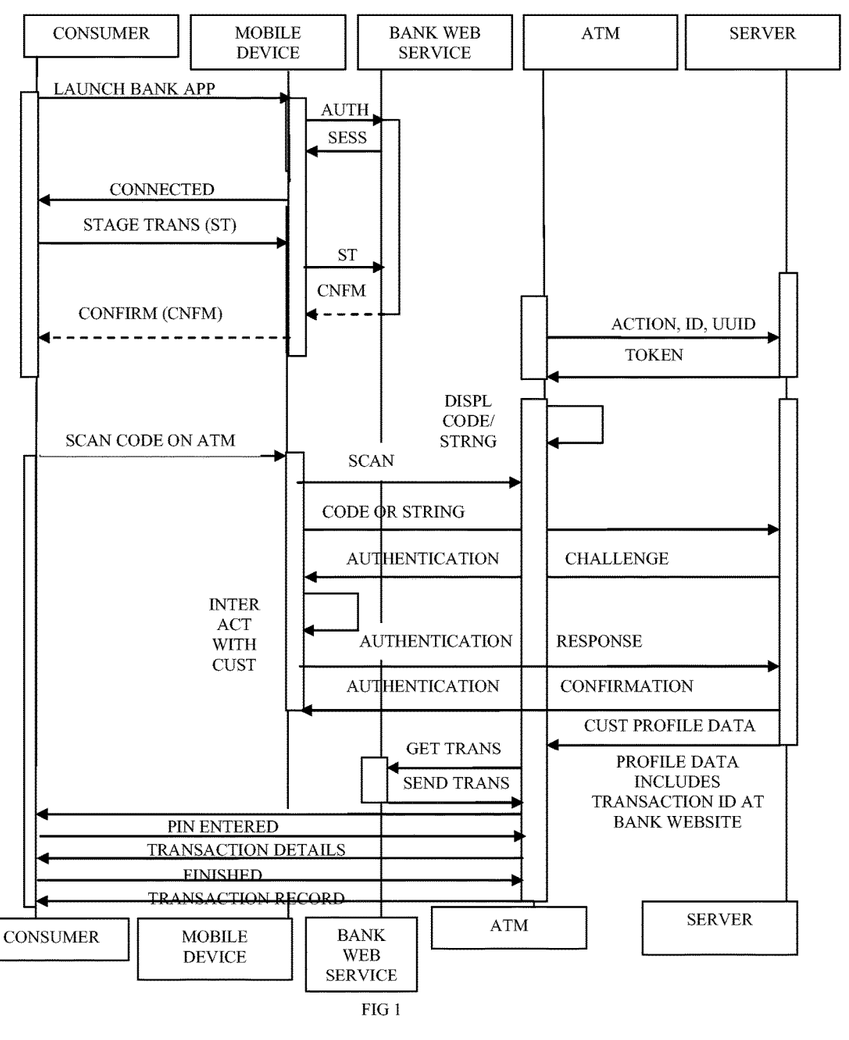
FIG. 1 is a flow diagram for an ATM transaction, according to an example embodiment.

FIG. 1 is a flow diagram for an ATM transaction, according to an example embodiment. The components of the diagram are implemented in non-transitory computer-readable storage medium for execution on one or more processing devices that are configured to execute the components. The components are also enabled to operate and communicate with one another over a network. The network can be wired, wireless, or a combination of wired and wireless.

It is noted that the components and the interactions of the components shown in the FIG. 1 are presented for illustrative purposes in a sample scenario with a sample enterprise system. So, other arrangements and interactions of the components are possible without departing from the beneficial teachings presented herein and below.

As will be more fully explained herein and below, the techniques and embodiments presented below enable a consumer to finalize a "staged" ATM transaction that was previously created by the customer either on their mobile device or online via a different device. The solution works without the need for the customer to insert their card into the ATM, and without NFC, which is the typical use-case brought forth in the ATM industry. Although as will be presented below NFC can be used in some scenarios in manners different from what the industry has proposed. In a typical embodiment presented herein, the ATM presents a 2D barcode to the consumer containing identifying information that can be used to retrieve the pre-staged transaction and execute it on the ATM. The consumer uses the bank's mobile application to connect to the transaction and confirm they are at the ATM ready to transact business.

The consumer launches a financial institution mobile application enabled with a mobile transaction service's capability.

The mobile application establishes a connection to the mobile transaction service.

The consumer, using the mobile device, selects the desired transaction type from any of the types made available by the banking mobile application. For example, cash withdrawal, deposit, or printed account statement. Other transaction types may be available, as offered by the financial institution.

The consumer, using the mobile application then stages the transaction by satisfying the parameters of the transaction—for example the amount of cash to withdraw, deposit amount, statement period, etc.

Alternatively, the customer may interact with the bank's web site to select the transaction type and stage the transaction.

Once staging is complete, the transaction need not be present on the mobile device, rather, it is associated with the consumer's identification token, created in the enrollment process, and is stored within the mobile transaction system.

In either case, the business web application calls a mobile transaction web service with a transaction Identifier (ID), unique session ID, or other information necessary to conduct the transaction.

The mobile transaction web service returns barcode and string data containing the portal Uniform Resource Locator (URL) link and the unique transaction ID, digitally signed with the private key of the business.

The ATM formats the barcode or string such that the consumer's mobile device can acquire the string. This is presented on the display of the enterprise's ATM.

The ATM blocks, or otherwise subscribes for notification from the service, awaiting confirmation that the ATM is to process a transaction for a consumer.

The consumer uses a business or financial institution mobile app to acquire the string via barcode from the screen display of the ATM or other method, such as NFC tap of mobile device with the ATM.

Business or financial mobile app of the mobile device then connects to the web service via secure connection, either through existing Over-The-Air (OTA) data connection, WiFi, SMS or other mechanism and presents the string.

Optionally the consumer authenticates with the web service via their mobile device with a secret, such as a Personal Identification Number (PIN), secure element token, biometrics or other method.

The consumer is presented with a transaction summary and total amount, previously returned from the mobile transaction service.

The consumer selects acceptance of any levied service fees and proceeds.

The selections are confirmed, and the mobile transaction service returns a transaction authorization code and any other relevant information required to complete the transaction at the Kiosk.

Optionally, the mobile device may receive transaction updates, an electronic receipt or other information related to the transaction.

Some example scenarios and benefits are now presented in the context of the FIG. 1.

Initially, a customer uses a financial or bank smart phone application (this can require the customer's PIN be entered). As stated above the initial staging of the ATM transaction can also occur via an out-band-mechanism from the perspective of the mobile device and the mobile app (e.g., the transaction can be staged via another computing device via an online connection with the financial institution's web site.) Next, the consumer defines his/her withdrawal details, via the smart phone app or online as discussed above. These details can include a variety of information, such as: cash amount, type of receipt delivery (paper, Short Message Service (SMS) text message, email, etc), preferred notes or denominations of the cash received, and the like.

Next, the customer physically goes to an ATM and is standing in front of the ATM. The consumer uses the smart phone to scan a Quick Relay (QR) code displayed during the idle loop. The QR code is dynamically acquired by the ATM (via interaction with the mobile transaction service as discussed above) and includes such things as: ATM ID; date & time of QR generating; and cryptic information (the information encoded in the QR code being displayed). The QR code is strongly reliable information to identify the ATM and establish a reliable connection between the mobile device of the consumer (such as a smart phone) and the ATM that the consumer is in front of. The QR code information is sent from the Smart phone to the bank phone server (mobile transaction service); with details of the mobile device to authenticate that the correct mobile device is in front of the correct ATM. Next, in some cases, a PIN can be asked to be entered on the smart phone; if authorized, the mobile transaction service finds the previous staged transaction and sends it to the ATM with an instruction for the ATM to process the transaction immediately. The consumer takes his/her cash; and optionally a receipt is received on the smart phone for the transaction.

A variety of options can be used such that other financial transactions can be processed and different types of authentication used. The security mechanisms used can be dictated by the financial institution and/or ATM operator. The bank may require a minimum amount of security and set maximum withdraw amounts.

The techniques herein rely on mobile device (such as smart phone, tablet, and the like) security and does not rely on traditional card-based security with the use of ATM keyboards, since no cards and no ATM keyboard are used to achieve the techniques discussed herein.

The benefits of the approach are many. For example, convenience is achieved because consumers use their own devices to define all needed input information, rather than the ATM; plus receipts are automatically delivered to the mobile device. With respect to security, the consumer spends less time in front of the ATM for withdrawal or deposit, so card fraud is diminished (no card skimming or fishing available). New users for a bank do not have to be issued physical cards to have ATM services available to them. There is not contact with the bacterial infested keyboards of the ATMs. No paper is printed so the approaches are environmentally friendly. The techniques can be used with existing ATM's and mobile devices with no upgrades needed.

Essentially, a mobile device or smart phone is used to: prepare the ATM transaction, authenticate the consumer, identify and couple the consumer with the ATM, confirm the transaction, receive output, if any from the transaction, and receive the transaction receipt.

The ATM is used to: tag itself with a unique ID (as provided by the mobile transaction service); display instructions; and deliver the transaction (deliver cash), when the transaction is for cash to be dispensed.

The ATM and mobile device are linked by a QR code (barcode or token). That Code is displayed on the ATM and scanned with the mobile device. May also be acquired as a token using NFC by tapping the mobile device to the ATM to acquire the token.

Again, a sample smart ATM withdrawal can be described as follows: user authenticates himself when using the bank smart phone application. User is preparing his withdrawal on its smart phone or on another device interacting with a mobile transaction service of the bank. The details are entered for the transaction as: 50 € with electronic receipt. Facing the ATM, the user uses its smart phone to scan the QR code displayed in the idle loop screen of the ATM. The QR code includes at least: ATM ID and a key based on time. The ATM dispenses the prepared withdrawal. The smart phone receives the receipt.

The benefits of this are: easy automated processing, mobile device users already like to use their mobile apps for everyday life transactions and they will find it natural and convenient to use the same and unique device to prepare and get cash from an ATM.

Financial institutions will like the techniques because it provides a mechanism for new servers and new consumers with mobile device accessibility. This can be viewed as an add-on service to existing ATM's; the objective does not have to be (although it can be) to replace ATM cards but to add a new and easy service to reach new customers and improve ATM Return On Investment (ROI).

The techniques also provide an opportunity to improve the image of any bank that can offer this service to their consumers. It also improves overall bank efficiency, since a prepared withdrawal is obviously much faster than a legacy one, which means fewer queues on the ATMs.

Smart withdrawal security could be re enforced using: withdrawal ceilings to limit fraud intentions; and PIN codes could be used to reinforce consumer authentication for a smart withdrawal typed on the smart phone or the ATM. GPS information may also be used to check mobile position/ATM position.

Some other embodiments can include: staging transactions directed to third-parties (family members, kids, etc.); finding a physically closest ATM using GPS information for the mobile device; applying the techniques to other financial transactions such as deposits, or have the ATM send a token as cash to the mobile APP for use as cash on the mobile device, electronic wallet type approach.

The FIG. 1 shows a sample flow of the description provided above, where the "Server" refers to the financial service discussed below.

Figure 2:
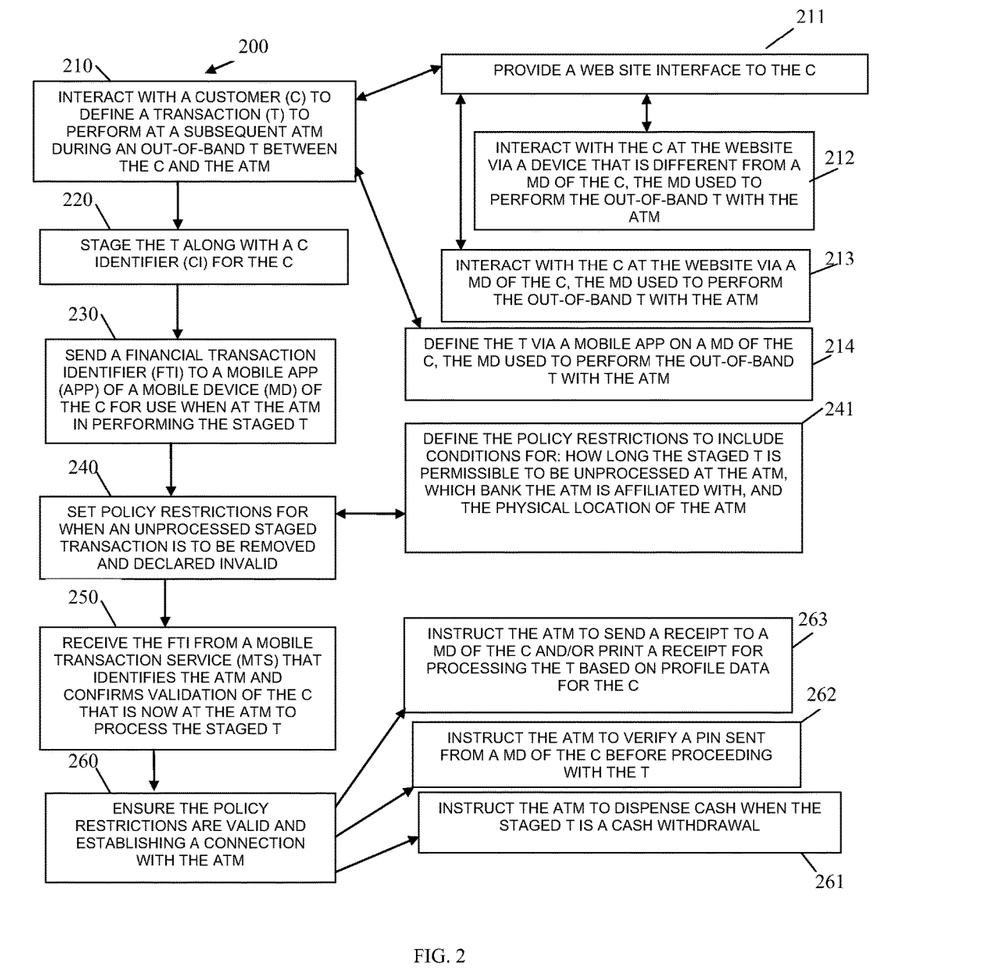
FIG. 2 is a diagram of a method for an ATM transaction, according to an example embodiment.

FIG. 2 is a diagram of a method 200 for an ATM transaction, according to an example embodiment. The method 200 (hereinafter "financial service") is implemented as instructions programmed and residing on a non-transitory computer-readable (processor-readable) storage medium and executed by one or more processors. The processors are specifically configured and programmed to process the financial service. The financial service operates over a network. The network is wired, wireless, or a combination of wired and wireless.

The financial service executes on one or more processors of a server. In some embodiments, the financial service operates in a cloud processing environment and is available as a cloud service over the Internet to enterprises and consumers.

The processing of the financial service interacts with consumer mobile device apps, applications and services of enterprise ATMs, and a mobile transaction service (discussed below with reference to the FIG. 4).

At 210, the financial service interacts with a customer to define a transaction to perform at a subsequent ATM during an out-of-band transaction between the customer and the ATM. In other words, the time when the transaction is defined is different and perhaps uses a different device (from the point-of-view of the customer) for that which the customer uses to define the transaction. The transaction can be any type of transaction that the bank permits to be executed via an ATM, such as cash withdrawals, deposits, balance inquiries, transfer of funds between accounts with a same financial institution, and/or transfer of funds between accounts of different institutions.

In an embodiment, at 211, the financial service provides a web site interface to the customer for defining the transaction. This can be accomplished by the customer via different devices and mechanisms.

For example, at 212, the financial service interacts with the customer at the website via a device that is different from a mobile device of the customer. The mobile device is used to perform the out-of-band transaction with the ATM at some subsequent point in time.

In another instance of 211 and at 213, the financial service interacts with the customer at the website via a mobile device of the customer. Again, the mobile device is subsequently used to perform the out-of-band transaction with the ATM.

In yet another situation at 214, the financial service defines the transaction via a mobile app (discussed below with reference to the FIG. 3). The mobile app processes on the mobile device and is subsequently used to perform the out-of-band transaction with the ATM. Here, custom screens within the mobile app permit defining of the transaction and this can be achieved without a website via an API with the financial service of the customer and through the mobile app. It may also be that the customer is near or at an ATM when the transaction is defined such that the delay in performing the out-band-transaction between the mobile device and the ATM can be short in duration. In fact, it can be any duration permitted by the financial service, short, medium, long, etc.

At 220, the financial service stages the transaction along with a customer identifier for the customer.

At 230, the financial service sends a financial transaction identifier to a mobile app of a mobile device of the customer for use when at the ATM in performing the staged transaction.

In some embodiments, the processing of 230 may not be necessary because the processing associated with the mobile transaction services (discussed below with reference to the FIG. 4) can be combined with the financial service's processing and the customer may be required to use an ATM of the financial institution associated with the financial service. In other words, suppose the customer is an account holder of Chase® Bank, and Chase® Bank operates or controls the financial service and the mobile transaction service and also distributes the mobile app. The Customer when using a Chase® Bank ATM would not have to have or even know about a financial transaction identifier or financial service identifier because in each case the direction of the processing can be resolved. However, in embodiments and in the real world customers often cannot find their financial institution's ATM and are often forced to use ATM's of other financial institution's that charge fees. In fact, some financial services, such as brokerage firms do not even have their own ATM's and rely on third-party institutions and their ATM's to provide money access to their customers. So, even though the processing at 230 discusses providing a financial transaction identifier (can be financial institution identifier as well because once the financial institution and the customer are known, the staged transaction can be found), this does not always have to be the case. As was discussed in detail above with reference to the FIG. 1.

At 240, the financial service sets policy restrictions for when an unprocessed staged transaction is to be removed and declared invalid. That is, the financial service can use financial institution defined policy restrictions and/or customer driven security restrictions identified as the policy restrictions to invalidate an unprocessed staged transaction. This is for security purposes.

According to an embodiment, at 241, the financial service defines the policy restrictions to include conditions for such things as, and by way of example only: how long the staged transaction is permissible to be unprocessed, which bank or financial institution the ATM has to be affiliated with, and a physical location or geographical area for which the selected customer ATM must reside to perform the staged transaction.

In an embodiment, at 250, the financial service receives the financial transaction identifier from a mobile transaction service (discussed above with reference to the FIG. 1 and below with reference to the FIG. 4) that identifies the ATM and confirms validation of the customer as now being at the ATM and requesting to now process the staged transaction.

Continuing with the embodiment at 250 and at 260, the financial service ensures the policy restrictions are valid and establishes a connection with the ATM that the customer is using.

In one case of 260 and at 261, the financial service instructs the ATM to dispense cash when the staged transaction is for a cash withdrawal.

In another case of 260 and at 262, the financial service instructs the ATM to verify a PIN sent from a mobile device of the customer before processed with the transaction. This PIN is entered in the mobile device and not via the ATM keyboard interface.

In yet another situation of 260 and at 263, the financial service instructs the ATM to send a receipt to a mobile device of the customer and/or print a receipt for the processing of the transaction and based on profile data and selections previously defined by the customer for the transaction. The customer can select an electronic receipt on the mobile device, a printer receipt from the ATM, or both an electronic and printed receipt.

It is also noted that in some embodiments, the customer in defining the transaction can define it such that a third-party and different customer (such as a family member) can subsequently execute the staged transaction at the ATM. In these cases, the customer that receives the financial transaction identifier (if one is needed as discussed above) is sent to the customer that is authorized to make the transaction at the ATM.

It should also be pointed out that although discussion assumes that the ATM is known, this is not the case, and the ATM is generic and not known until the customer selects a particular ATM to process the staged transaction. Although in some embodiments, a specific ATM can be defined by the customer and in such case that specific ATM has to be used by the customer to perform the staged transaction.

In another variation, the customer may define a staged transaction as a recurring transaction on a defined time period, if permissible by the financial institution. So, suppose a customer knows that once a month or twice a month, the customer will be withdrawing a set amount of cash to meet his/her monthly budget needs. Here, the customer may define such transaction once and it is available during the defined time periods for use multiple times.

Figure 3:
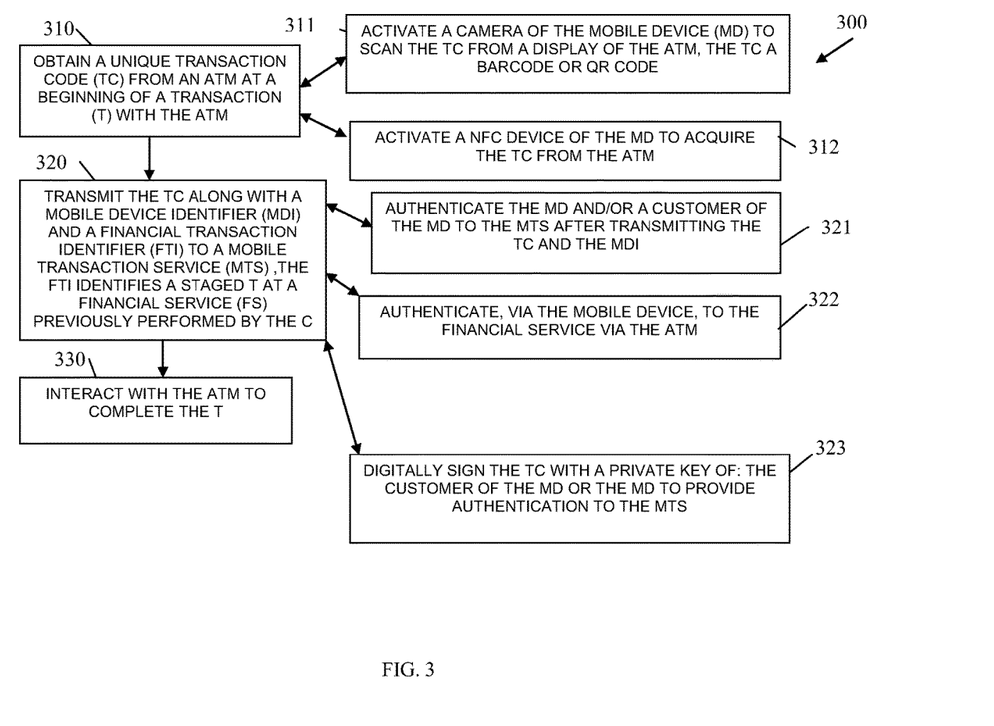
FIG. 3 is a diagram of another method for an ATM transaction, according to an example embodiment.

FIG. 3 is a diagram of another method 300 for an ATM transaction, according to an example embodiment. The method 300 (hereinafter "mobile app") is implemented as instruction and programmed within a non-transitory computer-readable (processor-readable) storage medium that executes on one or more processors of a mobile device (e.g., mobile phone, personal digital assistant (PDA), tablet, laptop, etc.); the processors of the mobile device are specifically configured to execute the mobile app. The mobile app is operational over a network; the network is wired, wireless, or a combination of wired and wireless.

The mobile app is controlled by a consumer (customer and/or user) and interacts with the financial service, represented by the method 200 of the FIG. 2 and also interacts with a mobile transaction service (discussed below with reference to the FIG. 4).

It is noted that the mobile app can be installed and initiated by the consumer on the mobile device in a variety of manners before the processing occurs as detailed below. For instance, in one situation during a registration process of the mobile device with a financial service, the mobile app is downloaded and initiated on the mobile device. In another instance, during an initial contact by the mobile device by activating a QR code for a first time that represents a unique transaction code for a retailer, the financial service is automatically contacted and downloads and installs on the mobile device and initiates a registration process. This may occur when the transaction for the ATM was staged by a device other than the mobile device. The remaining processing described for the mobile app assumes the mobile app is installed and executing on a mobile device of a consumer.

At 310, the mobile app obtains a unique transaction code from an ATM at a beginning of a transaction with the ATM. This is acquired automatically via the mobile device of the customer using the mobile app and acquired without manually accessing a touch screen or keyboard of the ATM. The unique transaction code provided by a mobile transaction service (discussed below with reference to the FIG. 4) or by a financial service of a particular financial institution that deploys the services of the mobile transaction service.

According to an embodiment, at 311, the mobile app activates a camera of the mobile device to scan the transaction code from a display of the ATM. Here, the transaction code is a barcode or a QR code presented on the welcome screen of the ATM.

In another case, at 312, the mobile app activates a NFC device of the mobile device to acquire the transaction code from the ATM's NFC device by tapping the mobile device against the ATM. In this case, the transaction code may be viewed as a NFC token and does not have to be a barcode and/or QR code and may not even be presented on the welcome screen of the ATM. That is, the ATM may just indicate somewhere NFC enabled or staged transaction processing available via NFC and the like, which may or may not be presented to the customer on the welcome screen.

At 320, the mobile app transmits the transaction code along with a mobile device identifier (such as a unique mobile device token previously registered and/or a Media Access Device (MAC) identifier, etc.) and a financial transaction identifier or financial institution identifier to a mobile transaction service (discussed below with reference to the FIG. 4 and discussed above with reference to the FIG. 1). The financial transaction identifier identifies a specific financial institution for the customer and a staged transaction at a specific financial service for that financial institution, the staged transaction previously defined or performed by the customer or by an authorized different customer on behalf of the customer (this processing was discussed in detail above with reference to the FIGS. 1 and 2). It is noted that if the ATM is for the financial institution of the customer then no financial transaction or financial institution identifier may be required to be sent to the mobile transaction service as was also discussed above with reference to the FIG. 2.

According to an embodiment, at 321, the mobile app authenticates the mobile device and/or the customer of the mobile device to the mobile transaction service after transmitting the transaction code and the mobile device identifier (and the financial transaction identifier).

In another case, at 322, the mobile app authenticates, via the mobile device, to the financial service using the ATM. So, the ATM can communicate wirelessly in this embodiment with the mobile app of the mobile device to authenticate the customer, such as via a PIN entry or other security verification.

In yet another situation, at 323, the mobile app digitally signs the transaction code with a private key of: the customer of the mobile device or the mobile device to provide authentication to the mobile transaction service.

Finally, at 330, the mobile app interacts with the ATM to complete the transaction as needed. Here, transaction receipts may be electronically delivered to the mobile device if desired by the customer. Optionally or perhaps additionally the receipt may be printed from the ATM.

Figure 4:
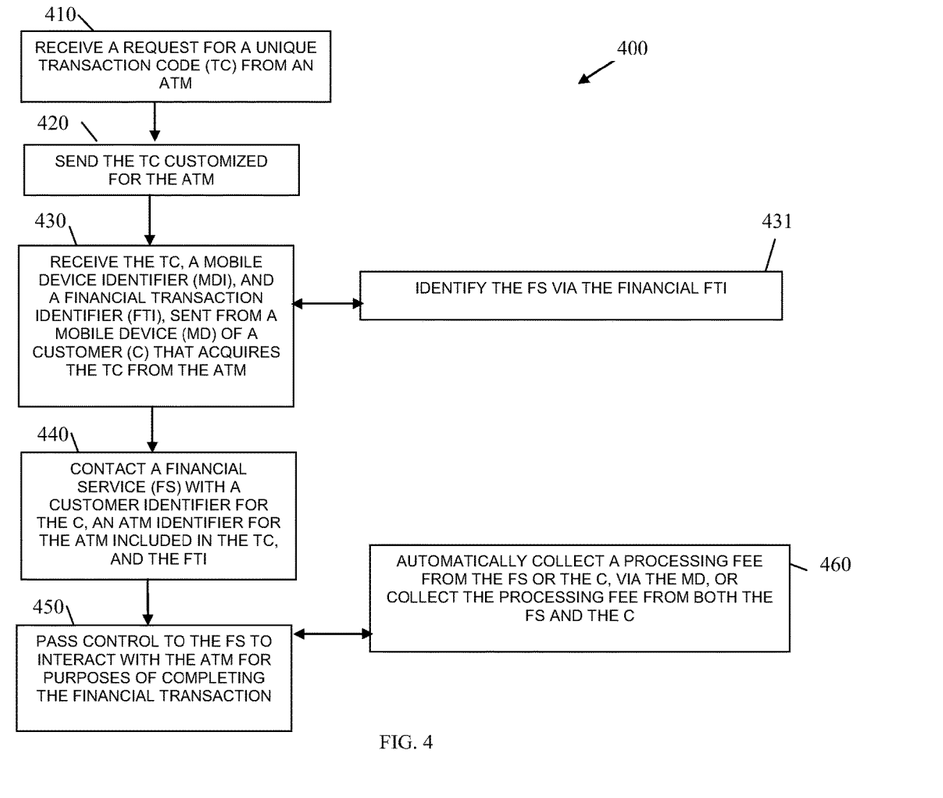
FIG. 4 is a diagram of yet another method for an ATM transaction, according to an example embodiment.

FIG. 4 is a diagram of yet another method 400 for an ATM transaction, according to an example embodiment. The method 400 (hereinafter "mobile transaction service") is implemented as executable instructions and programmed within a non-transitory computer-readable (processor-readable) storage medium that executes on one or more processors of the mobile transaction service the processors of server are specifically configured to execute the mobile transaction service. The mobile transaction service is operational over a network; the network is wired, wireless, or a combination of wired and wireless.

The FIG. 1 described the processing for automating an ATM transaction as a whole. The FIG. 2 described the processing from the perspective of the financial service; the FIG. 3 described the processing from the perspective of the consumer's mobile app on a consumer's mobile device; and the mobile transaction service of the FIG. 4 describes the processing from a mobile transaction service. An automated ATM transaction is automated and customized via the interaction among the financial service (of the FIG. 2), the mobile app (of the FIG. 3), and the mobile transaction service (of the FIG. 4).

At 410, the mobile transaction service receives a request for a unique truncation code (hereinafter just "transaction code or token") from an ATM. That is at the conclusion of a previous ATM transaction a new transaction code is sent to the ATM. It may also be that the ATM acquires batches of transaction codes from the mobile transaction service and manages these on its own until depleted and at such time a new batch of transaction codes are requested of the mobile transaction service.

At 420, the mobile transaction service sends the transaction code customized for the ATM to the ATM for display on (display via barcode or QR code) or for acquisition from the ATM (acquisition via NFC).

At 430, the mobile transaction service receives the transaction code, a mobile device identifier (such as a unique mobile device token and/or MAC identifier for the mobile device), and a financial transaction or financial institution identifier. This information is sent from the mobile device of the customer, via the mobile app of the FIG. 3, and the mobile app acquires the transaction code from the ATM, such as a scan of a barcode or QR code, or NFC token via an NFC tap to the ATM.

According to an embodiment, at 431, the mobile transaction service identifies a specific financial service via the financial transaction or financial institution identifier sent from the mobile app of the mobile device with the transaction code.

Again, it is noted that the financial transaction or financial institution identifier is not needed in all cases, but having it permits usage of third-party bank ATM's in an automated manner.

At 440, the mobile transaction service contacts the financial service with a customer identifier for the customer and ATM identifier for the ATM, which was included in the transaction code, and the financial transaction identifier (optionally to identify the specific staged transaction).

At 450, the mobile transaction service passes control to the financial service (as discussed with FIGS. 1 and 2 above) to interact with the ATM for purposes of completing the financial transaction.

In some cases, at 460, the mobile transaction service may not be integrated with any particular financial institution and may be an independent service offered to financial institutions. In such a scenario it may be desirable for the entity providing the mobile transaction service to charge and automatically collect a processing fee from the financial service (or financial institution) and/or the customer, via the mobile device. The processing at 460 accounts for this embodiment and configuration.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a server configured to execute the method, comprising:

interacting, at the server, with a customer to define a transaction to perform at a subsequent Automated Teller Machine (ATM), wherein interacting further includes wherein the defining, by the customer, the transaction during an out-of-band transaction between the customer and the ATM, and wherein processing the out-of-band transaction as a staged transaction during an online connection with a financial institution, and processing the particular staged transaction during the online connection at a different and prior time from subsequent time for processing the transaction at the ATM by the customer;

staging, at the server, the staged transaction along with a customer identifier for the customer;

sending, from the server, a financial transaction identifier to a mobile app of a mobile device of the customer for processing the staged transaction at the subsequent time on the ATM;

setting, at the server, policy restrictions for when any unprocessed staged transaction is to be removed and declared invalid for processing at the subsequent time on the ATM; and providing, from the server, a barcode for the staged transaction to the ATM and displaying, by the ATM, during an idle loop of the ATM the barcode that identifies the ATM and a date and time for the barcode generation, acquiring, by a mobile device of the customer, the barcode via a scan from the mobile device of the customer and sending from the mobile device the scanned barcode to a mobile transaction service for a bank associated with the ATM and providing, by the mobile transaction service to the ATM, authentication of the customer and establishing, by the ATM, a connection between the mobile device and the ATM and permitting, by the ATM, the mobile transaction service to locate the staged transaction and processing, by the ATM, the staged transaction on behalf of the customer for completing the staged transaction.

2. The method of claim 1, wherein interacting. rther includes providing a web site interface to the customer.

3. The method of claim 2, wherein providing further includes interacting with the customer at the website via a device that is different, from a mobile device of the customer, the mobile device used to perform the out-of-band transaction with the ATM.

4. The method of claim 2, wherein providing further includes interacting with the customer at the website via a mobile device of the customer, the mobile device used to perform the out-of-band transaction with the ATM.

5. The method of claim 1, wherein interacting further includes defining the staged transaction via a mobile app on a mobile device of the customer, the mobile device used to perform the out-of-band transaction with the ATM.

6. The method of claim 1, wherein setting further includes defining the policy restrictions to include conditions for: how long the staged transaction is permissible to be unprocessed at the ATM, which bank the ATM is affiliated with, and the physical location of the ATM.

7. The method of claim 1 further comprising, receiving the financial transaction identifier from the mobile transaction service that identifies the ATM and confirms validation of the customer that is now at the ATM to process the staged transaction.

8. The method of claim 7 further comprising, ensuring the policy restrictions are valid and establishing a connection with the ATM.

9. The method of claim 8 further comprising, instructing the ATM to dispense cash when the staged transaction is a cash withdrawal.

10. The method of claim 8 further comprising, instructing the ATM to verify a Personal Identification Number (PIN) sent from a mobile device of the customer before proceeding with processing the staged transaction.

11. The method of claim 8 further comprising, instructing the ATM to send a receipt to a mobile device of the customer and/or print a receipt for processing the staged transaction based on profile data for the customer.

* * * * *